(12) United States Patent
Watanabe et al.

(10) Patent No.: US 12,059,827 B2
(45) Date of Patent: Aug. 13, 2024

(54) APPARATUS, MOLD SET, AND METHOD FOR PRODUCING METAL-RESIN COMPOSITE

(71) Applicants: KOBE STEEL, LTD., Hyogo (JP); RAPIIT CO., LTD., Okayama (JP)

(72) Inventors: Kenichi Watanabe, Kobe (JP); Ryohei Ihara, Kobe (JP); Zenzo Yamaguchi, Kobe (JP); Takuro Shigetomo, Okayama (JP)

(73) Assignees: KOBE STEEL, LTD., Hyogo (JP); RAPIIT CO., LTD., Okayama (JP)

( * ) Notice: Subject to any disclaimer, the term of this patent is extended or adjusted under 35 U.S.C. 154(b) by 0 days.

(21) Appl. No.: 17/934,384

(22) Filed: Sep. 22, 2022

(65) Prior Publication Data
US 2023/0111000 A1   Apr. 13, 2023

(30) Foreign Application Priority Data

Oct. 8, 2021   (JP) ................................. 2021-166372

(51) Int. Cl.
*B29C 43/18* (2006.01)
*B29C 43/36* (2006.01)
(Continued)

(52) U.S. Cl.
CPC .............. *B29C 43/18* (2013.01); *B29C 43/36* (2013.01); *B29C 43/52* (2013.01);
(Continued)

(58) Field of Classification Search
CPC ......... B29C 43/14; B29C 43/18; B29C 43/36; B29C 33/306; B29C 2043/3602;
(Continued)

(56) References Cited

U.S. PATENT DOCUMENTS 4,378,265 A * 3/1983 Kiss ...................... B29C 70/461
264/119
2004/0096535 A1* 5/2004 Hudecek ............... B29C 33/306
249/102

(Continued)

FOREIGN PATENT DOCUMENTS

| JP | 2020-104411 A | | 7/2020 |
| JP | 2021091139 A | * | 6/2021 |
| WO | 2015/034119 A1 | | 3/2015 |

OTHER PUBLICATIONS

The extended European search report issued by the European Patent Office on Feb. 20, 2023, which corresponds to European Patent Application No. 22199850.3-1014 and is related to U.S. Appl. No. 17/934,384.

*Primary Examiner* — Jerzi H Moreno Hernandez
(74) *Attorney, Agent, or Firm* — Studebaker & Brackett PC (57) ABSTRACT

An apparatus for manufacturing a metal-resin composite by press molding includes upper and lower molds sandwiching a metal member and a resin material, a molding auxiliary component detachably fixed to the upper mold to fill part of a cavity for the resin material between the upper and lower molds, and a drive unit that vertically moves at least one of the upper and lower molds. The molding auxiliary component has a first press surface for molding the metal member. The upper mold has a second press surface for integrally molding the metal member and the resin material when the molding auxiliary component is removed. The upper and lower molds are for pressing the resin material between the second press surface and the lower mold to cause the resin to flow to fill the cavity with the resin material when the molding auxiliary component is removed.

11 Claims, 8 Drawing Sheets

(51) Int. Cl.
  *B29C 43/52* (2006.01)
  *B29L 31/30* (2006.01)
(52) U.S. Cl.
  CPC .. *B29C 2043/185* (2013.01); *B29C 2043/189* (2013.01); *B29L 2031/3002* (2013.01)
(58) Field of Classification Search
  CPC ....... B29C 70/46; B29C 70/461; B29C 70/76; B21D 47/04; B29K 2705/00; B29L 2031/3002; B29L 2009/003; B62D 29/001; B62D 29/004; B62D 29/005
  See application file for complete search history.

(56) References Cited

U.S. PATENT DOCUMENTS

| | | | | |
|---|---|---|---|---|
| 2012/0309247 | A1* | 12/2012 | Kleine | B29C 70/54 |
| | | | | 156/60 |
| 2016/0016359 | A1* | 1/2016 | Kondo | B29C 43/18 |
| | | | | 428/139 |
| 2016/0303781 | A1* | 10/2016 | Vogler | B29C 45/40 |
| 2022/0395885 | A1* | 12/2022 | Watanabe | B29C 70/46 |

* cited by examiner

APPARATUS, MOLD SET, AND METHOD FOR PRODUCING METAL-RESIN COMPOSITE

CROSS-REFERENCE TO RELATED APPLICATIONS

This application claims priority of Japanese Patent Application No. 2021-166372 filed on Oct. 8, 2021, the contents of which are incorporated herein by reference.

BACKGROUND OF THE INVENTION

Field of the Invention

The present invention relates to an apparatus, a mold set, and a method for producing a metal-resin composite.

Description of Related Art

An apparatus for producing a metal-resin composite by press molding a metal member and a thermosetting resin material is known (for example, JP 2020-104411 A). The metal-resin composite is integrally molded by press molding a metal member previously press molded by a press apparatus separate from the above apparatus and a resin material with the above apparatus. That is, in the production of the metal-resin composite, a mold for press molding a metal member and a mold for integrally molding the metal member and a resin material are used.

SUMMARY OF THE INVENTION

In a case where the metal-resin composite is molded using a set of molds, a metal member is press molded into a predetermined shape, and then the metal member and a resin material are press molded using a mold used for the press molding of the metal member. In this case, since a cavity of the mold is designed in accordance with a shape of the metal-resin composite, that is, a final shape into which the metal member and the resin material are integrally molded, it is difficult to press mold the metal member along a lower mold, and molding accuracy of the metal member may be deteriorated.

An object of the present invention is to improve molding accuracy of a metal member in an apparatus, a mold set, and a method for producing a metal-resin composite with a set of molds.

A first aspect of the present invention provides an apparatus for producing a metal-resin composite by press molding a metal member and a resin material. The apparatus includes a mold including an upper mold and a lower mold that sandwich the metal member and the resin material, a molding auxiliary component detachably fixed to the upper mold so as to fill at least a part of a cavity for arranging the resin material formed by the upper mold and the lower mold, and a drive unit that moves at least one of the upper mold and the lower mold in a vertical direction. The molding auxiliary component has a first press surface for molding the metal member, and the upper mold has a second press surface for integrally molding the metal member and the resin material, and a distance between the first press surface and the lower mold in a state where the molding auxiliary component is attached is shorter than a distance between the second press surface and the lower mold in a state where the molding auxiliary component is removed.

In a case where press molding of the metal member and integral molding of the metal member and the resin material are performed with a set of the molds, the cavity in which the resin material is arranged is formed in a state where the upper mold and the lower mold are closed. For this reason, during press molding of the metal member, the upper mold cannot mold the metal member along the shape of a molding surface of the lower mold in a location where the cavity is formed. In contrast, according to this configuration, first, the molding auxiliary component is attached to the upper mold when the metal member is press molded, and then the molding auxiliary component can be removed from the upper mold when the metal-resin composite is press molded. Further, a distance between the first press surface and the lower mold in a state where the molding auxiliary component is removed is shorter than a distance between the second press surface and the lower mold in a state where the molding auxiliary component is attached. That is, since at least a part of the cavity is filled with the molding auxiliary component during the press molding of the metal member, the cavity is reduced, and the metal member easily follows the shape of the lower mold during the press molding of the metal member. As a result, molding accuracy of the metal member can be improved. Then, when the metal-resin composite is press molded, the cavity having a desired size and shape can be formed by removing the molding auxiliary component, so that the metal-resin composite having a desired shape can be produced.

The metal-resin composite may have, in a cross section perpendicular to a longitudinal direction, a bottom wall portion extending in a horizontal direction, side wall portions rising from both ends of the bottom wall portion, and a flange portion extending outward in the horizontal direction from the side wall portion, the upper mold may have, in the cross section, a first molding upper surface for molding the bottom wall portion, a second molding upper surface for molding the side wall portion, and a third molding upper surface for molding the flange portion, and the molding auxiliary component may be arranged so as to cover a corner portion formed by the first molding upper surface and the second molding upper surface.

According to this configuration, the cavity at the corner portion is reduced. At a location where the cavity is reduced, the metal member easily follows the shape of the lower mold during press molding of the metal member, so that molding accuracy of the metal member can be improved. In particular, since the molding accuracy is required at the corner portion, it is effective to increase the dimensional accuracy by reducing the cavity at the corner portion.

A step may be provided on the second molding upper surface.

According to this configuration, since the resin material needs to flow beyond the step of the upper mold in order to leak out of the cavity, the cavity can be sealed by the step. Therefore, leakage of the resin material can be suppressed. That is, the filling pressure of the resin material in the cavity can be increased, and the quality can be improved.

The molding auxiliary component may be detachably fixed to the upper mold so as to fill the entire cavity.

According to this configuration, in a case where the upper mold and the lower mold are closed in a state where the molding auxiliary component is attached to the upper mold, the metal member easily follows the shape of the lower mold during press molding of the metal member because there is no cavity. For this reason, molding accuracy of the metal member can be improved.

The molding auxiliary component may be provided with a through hole, the upper mold may be provided with a screw hole aligned with the through hole, and the molding auxiliary component may be fixed to the upper mold as a screw is fastened to the screw hole via the through hole.

According to this configuration, the molding auxiliary component can be mechanically and firmly fixed to the upper mold. For this reason, detachment of the molding auxiliary component from the upper mold can be suppressed or prevented during press molding.

A second aspect of the present invention provides a mold set for producing a metal-resin composite by press molding a metal member and a resin material. The mold set includes a mold including an upper mold and a lower mold that sandwich the metal member and the resin material, and a molding auxiliary component detachably fixed to the upper mold so as to fill at least a part of a cavity for arranging the resin material formed by the upper mold and the lower mold. The molding auxiliary component has a first press surface for molding the metal member, and the upper mold has a second press surface for integrally molding the metal member and the resin material, and a distance between the first press surface and the lower mold in a state where the molding auxiliary component is attached is shorter than a distance between the second press surface and the lower mold in a state where the molding auxiliary component is removed.

In a case where press molding of the metal member and integral molding of the metal member and the resin material are performed with a set of the molds, the cavity in which the resin material is arranged is formed in a state where the upper mold and the lower mold are closed. For this reason, during press molding of the metal member, the upper mold cannot mold the metal member along the shape of a molding surface of the lower mold in a location where the cavity is formed. In contrast, according to this configuration, first, the molding auxiliary component is attached to the upper mold when the metal member is press molded, and then the molding auxiliary component can be removed from the upper mold when the metal-resin composite is press molded. In this manner, since at least a part of the cavity is filled with the molding auxiliary component during the press molding of the metal member, the cavity is reduced, and the metal member easily follows the shape of the lower mold during the press molding of the metal member. As a result, molding accuracy of the metal member can be improved. Then, when the metal-resin composite is press molded, the cavity having a desired size and shape can be formed by removing the molding auxiliary component, so that the metal-resin composite having a desired shape can be produced.

A third aspect of the present invention provides a method for producing a metal-resin composite by press molding a metal member and a resin material. The method includes preparing a mold including an upper mold and a lower mold that sandwich the metal member and the resin material, and a molding auxiliary component detachably fixed to the upper mold so as to fill at least a part of a cavity for arranging the resin material formed by the upper mold and the lower mold, closing the upper mold to which the molding auxiliary component is attached and the lower mold to press mold the metal member, opening the upper mold to which the molding auxiliary component is attached and the lower mold to arrange the resin material on the metal member that is press molded, and closing the upper mold from which the molding auxiliary component is removed and the lower mold to integrally mold the metal member and the resin material.

In a case where press molding of the metal member and integral molding of the metal member and the resin material are performed with a set of the molds, the cavity in which the resin material is arranged is formed in a state where the upper mold and the lower mold are closed. For this reason, during press molding of the metal member, the upper mold cannot mold the metal member along the shape of a molding surface of the lower mold in a location where the cavity is formed. In contrast, according to this configuration, since at least a part of the cavity is filled with the molding auxiliary component during the press molding of the metal member, the cavity is reduced, and the metal member easily follows the shape of the lower mold during the press molding of the metal member. As a result, molding accuracy of the metal member can be improved. Further, when the metal-resin composite is press molded, the cavity having a desired size and shape can be formed by removing the molding auxiliary component, so that the metal-resin composite having a desired shape can be produced.

According to the present invention, in an apparatus, a mold set, and a method for producing a metal-resin composite with a set of molds, molding accuracy of a metal member can be improved.

DETAILED DESCRIPTION OF THE
PREFERRED EMBODIMENT

Hereinafter, an apparatus, a mold set, and a method for producing a metal-resin composite will be described as an embodiment of the present invention with reference to the accompanying drawings.

First Embodiment

Figure 1:
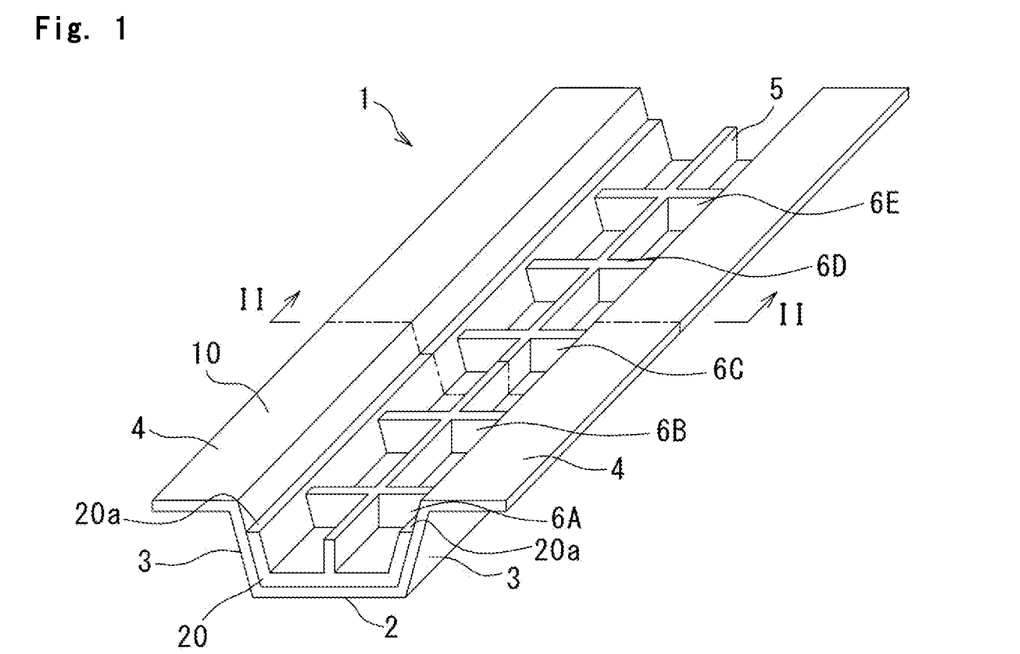
FIG. 1 is a perspective view of a metal-resin composite according to a first embodiment of the present invention.
Figure 2:
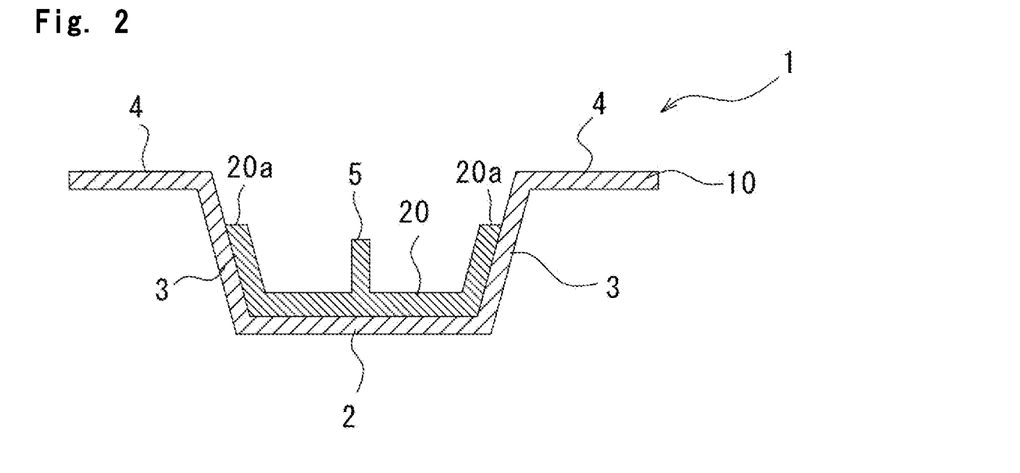
FIG. 2 is a cross-sectional view taken along line II-II in FIG. 1.

Referring to FIGS. 1 and 2, a metal-resin composite 1 produced in the present embodiment includes a metal plate (metal member) 10 and a resin material 20. As illustrated in FIG. 2, the metal-resin composite 1 has a hat shape in a cross section perpendicular to a longitudinal direction. Specifically, the metal-resin composite 1 is formed by fixing the resin material 20 to an inner surface (recessed surface) of the metal plate 10 having a hat shape. However, the shape of the metal-resin composite 1 is not limited to a hat shape, and may be any shape.

The metal-resin composite 1 includes a bottom wall portion 2 extending in the horizontal direction, side wall portions 3 rising from both ends of the bottom wall portion 2, and a flange portion 4 extending outward in the horizontal direction from the side wall portion 3. The bottom wall portion 2 includes the metal plate 10 and the resin material 20, the side wall portion 3 includes the metal plate 10 and the resin material 20, and the flange portion 4 includes only the metal plate 10. In the present embodiment, the resin material 20 in the side wall portion 3 extends from the bottom wall portion 2 toward the flange portion 4 and terminates at an end surface 20a on the side wall portion 3.

As illustrated in FIG. 1, in the present embodiment, the resin material 20 has a first rib 5 extending in a longitudinal direction and second ribs 6A to 6E extending in a lateral direction. Specifically, the first rib 5 is provided substantially at the center in the lateral direction of an upper surface of the resin material 20 of the bottom wall portion 2. The second ribs 6A to 6E are provided on the upper surface of the resin material 20 of the bottom wall portion 2 at substantially equal intervals in the longitudinal direction so as to connect the resin material 20 on the side wall portion 3 and the resin material 20 on the bottom wall portion 2.

An apparatus 50 and a mold set 80 for producing the metal-resin composite 1 in the present embodiment will be described with reference to FIGS. 3 to 8.

Figure 3:
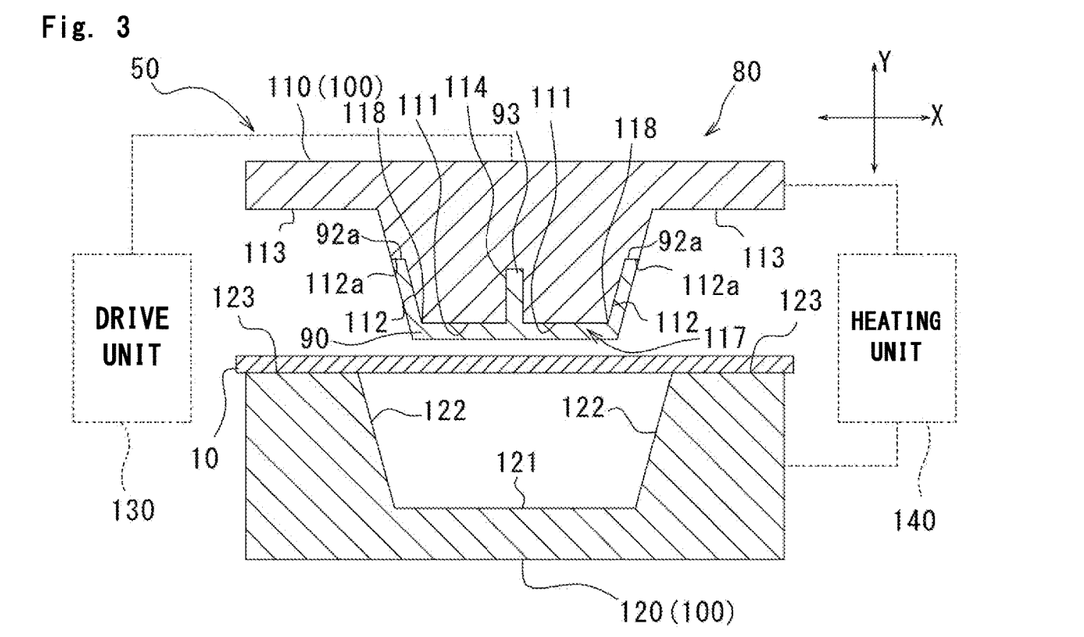
FIG. 3 is a schematic diagram of an apparatus according to the first embodiment of the present invention.

Referring to FIG. 3, the apparatus 50 for producing the metal-resin composite 1 in the present embodiment includes the mold set 80 including a mold 100, a drive unit 130 that drives the mold 100, and a heating unit 140 that heats the mold. Note that, as the drive unit 130 and the heating unit 140, publicly-known units capable of executing press molding can be used, and details are not illustrated and a conceptual diagram is illustrated only in FIG. 3, and illustration is omitted subsequent diagrams.

The mold set 80 includes the mold 100 and a cap (molding auxiliary component) 90.

The mold 100 is for press molding the metal plate 10 and the resin material 20 to produce the metal-resin composite 1. The mold 100 includes an upper mold 110 and a lower mold 120 that sandwich the metal plate 10 and the resin material 20. In the present embodiment, the upper mold 110 is configured as a punch, and the lower mold 120 is configured as a die. The upper mold 110 is movable in the vertical direction by the drive unit 130, that is, is configured to be capable of approaching and separating from the lower mold 120. However, a driving mode of the mold 100 by the drive unit 130 is not particularly limited, and the drive unit 130 may be one that moves at least one of the upper mold 110 and the lower mold 120 in the vertical direction. Further, although the upper mold 110 is configured as one member in the present embodiment, the upper mold 110 may be configured by two or more components such as a punch 110a and a holder 110b as in a variation illustrated in FIG. 8.

Figure 4:
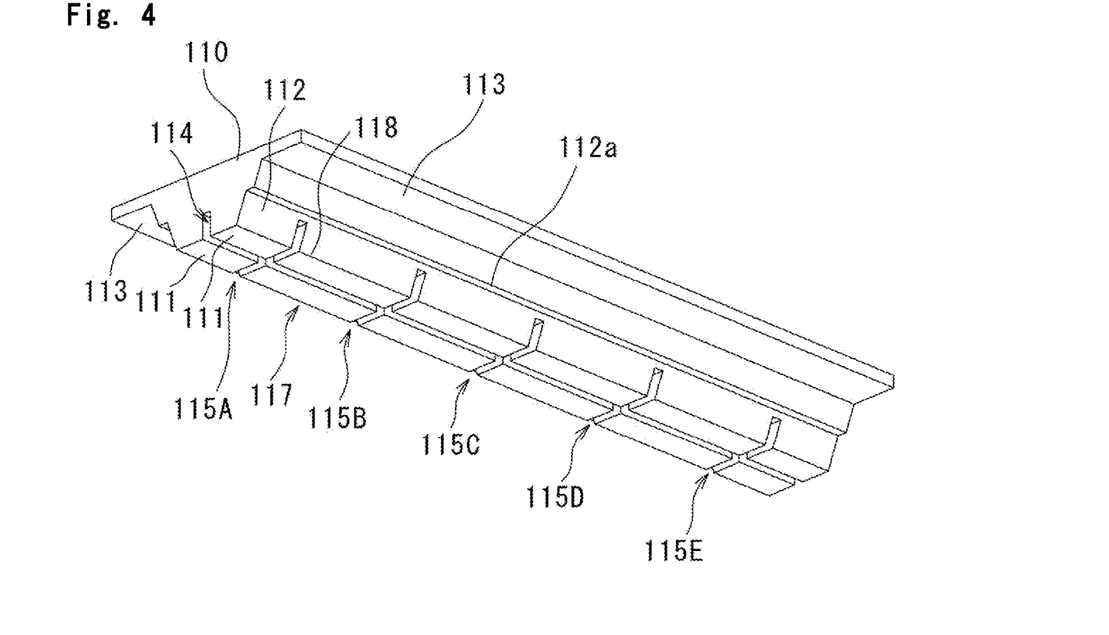
FIG. 4 is a perspective view of an upper mold according to the first embodiment of the present invention.

Referring to FIGS. 3 and 4, the upper mold 110 has a first molding upper surface 111 for molding the bottom wall portion 2 (see FIG. 2), a second molding upper surface 112 for molding the side wall portion 3 (see FIG. 2), and a third molding upper surface 113 for molding the flange portion 4 (see FIG. 2). In the present embodiment, the first molding upper surface 111 and the third molding upper surface 113 are configured as horizontal surfaces, and the second molding upper surface 112 is configured to connect the first molding upper surface 111 and the third molding upper surface 113 and to be inclined from the vertical direction. As will be described in detail later, the upper mold 110 has a second press surface 117 for integrally molding the metal plate 10 and the resin material 20. In the present embodiment, the second press surface 117 includes the first molding upper surface 111, the second molding upper surface 112, and the third molding upper surface 113.

In the present embodiment, a step 112a is provided on the second molding upper surface 112. The step 112a is provided so as to rise one step from the first molding upper surface 111 toward the third molding upper surface 113.

In the present embodiment, the upper mold 110 is provided with a first groove portion 114 extending in the longitudinal direction and second groove portions 115A to 115E extending in the lateral direction. Specifically, the first groove portion 114 is provided substantially at the center in the lateral direction of the first molding upper surface 111, and the second groove portions 115A to 115E are provided at substantially equal intervals in the longitudinal direction on the first molding upper surface 111 and the second molding upper surface 112.

Referring to FIG. 3, the lower mold 120 has a first molding lower surface 121 for molding the bottom wall portion 2 (see FIG. 2), a second molding lower surface 122 for molding the side wall portion 3 (see FIG. 2), and a third molding lower surface 123 for molding the flange portion 4 (see FIG. 2). In the present embodiment, the first molding lower surface 121 and the third molding lower surface 123 are configured as horizontal surfaces, and the second molding lower surface 122 is configured to connect the first molding lower surface 121 and the third molding lower surface 123 and to be inclined from the vertical direction. The first molding lower surface 121 is arranged to face the first molding upper surface 111, the second molding lower surface 122 is arranged to face the second molding upper surface 112, and the third molding lower surface 123 is arranged to face the third molding upper surface 113.

Figure 5:
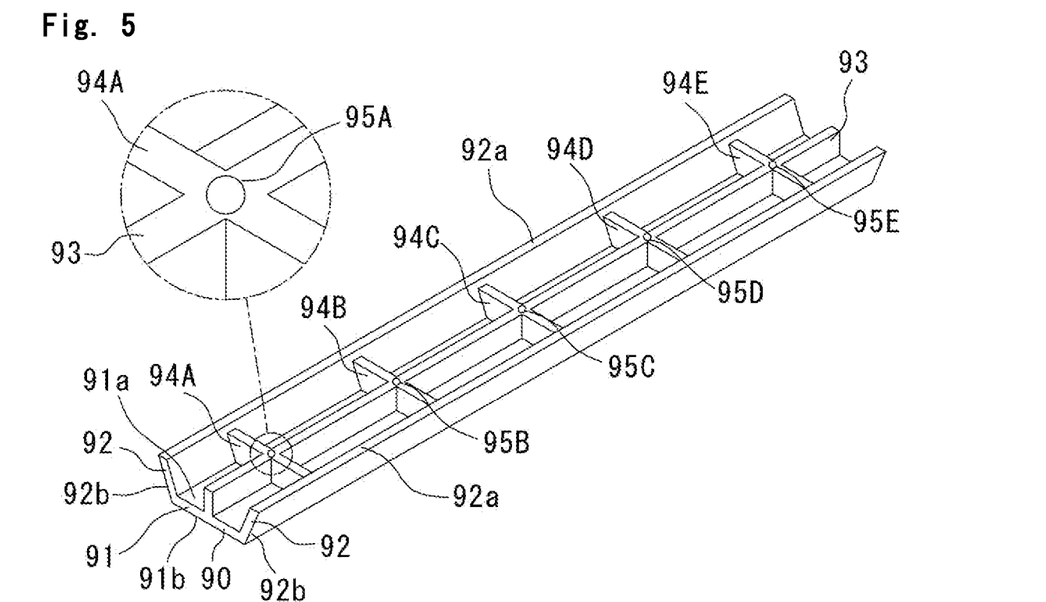
FIG. 5 is a perspective view of a molding auxiliary component according to the first embodiment of the present invention.

Referring also to FIG. 5, the cap 90 includes a plate-shaped cap bottom wall 91 and a cap side wall 92 rising from both ends of the cap bottom wall 91 and terminating at a cap end surface 92a. As will be described in detail later, the cap 90 has a first press surface 97 for molding the metal plate 10. In the present embodiment, the first press surface 97 includes a lower surface 91b of the cap bottom wall 91 and an outer surface 92b of the cap side wall 92.

Further, in the cap 90, a first protrusion 93 extending in the longitudinal direction is provided substantially at the center in the lateral direction of the upper surface 91a of the cap bottom wall 91. Furthermore, in the cap 90, second protrusions 94A to 94E extending in the lateral direction are provided on the upper surface 91a of the cap bottom wall 91 at substantially equal intervals in the longitudinal direction.

In the present embodiment, the material of the cap 90 is hard metal, but may be soft metal, resin, or the like. Further, in the present embodiment, the cap 90 is formed by cutting, but may be formed by another processing method such as casting or 3D printing.

Figure 6:
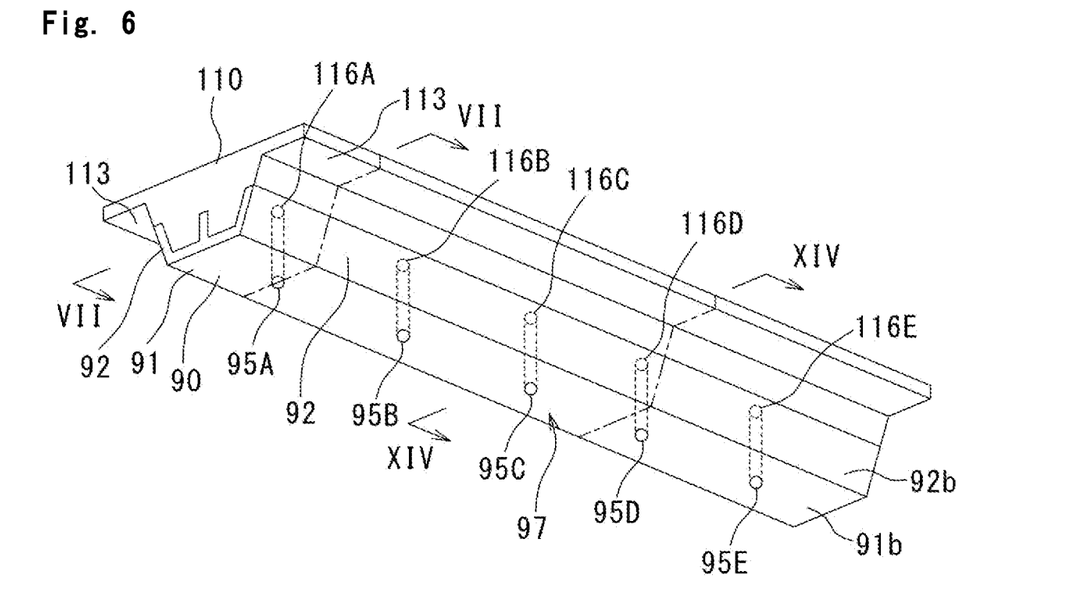
FIG. 6 is a perspective view of the upper mold and the molding auxiliary component according to the first embodiment of the present invention.

Referring to FIGS. 3 and 6, the cap 90 is attached to the upper mold 110 such that the upper surface 91a of the cap bottom wall 91 is in contact with the first molding upper surface 111, the outer surface 92b of the cap side wall 92 is in contact with the second molding upper surface 112, and the cap end surface 92a is in contact with the step 112a. Further, the cap 90 is attached to the upper mold 110 such that the first protrusion 93 is fitted into the first groove portion 114 and the second protrusions 94A to 94E are fitted into the second groove portions 115A to 115E. That is, the cap 90 is arranged so as to cover a corner portion 118 formed by the first molding upper surface 111 and the second molding upper surface 112. In the present embodiment, the cap 90 is fixed to the upper mold 110 so as to fill an entire cavity C (see FIG. 12) described later.

Figure 7:
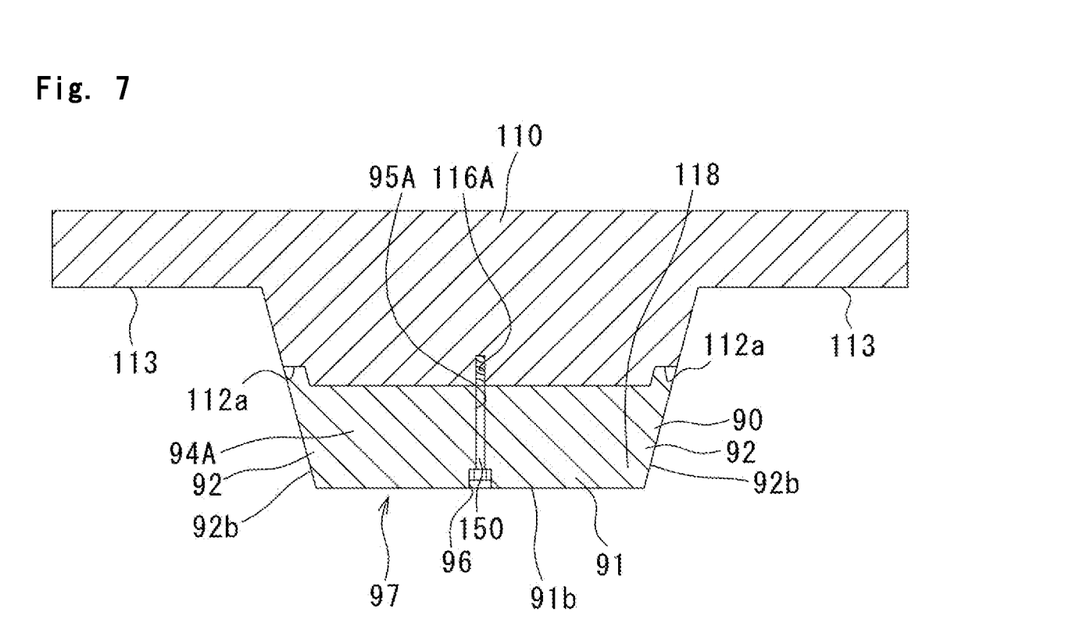
FIG. 7 is a cross-sectional view taken along line VII-VII in FIG. 6.
Figure 8:
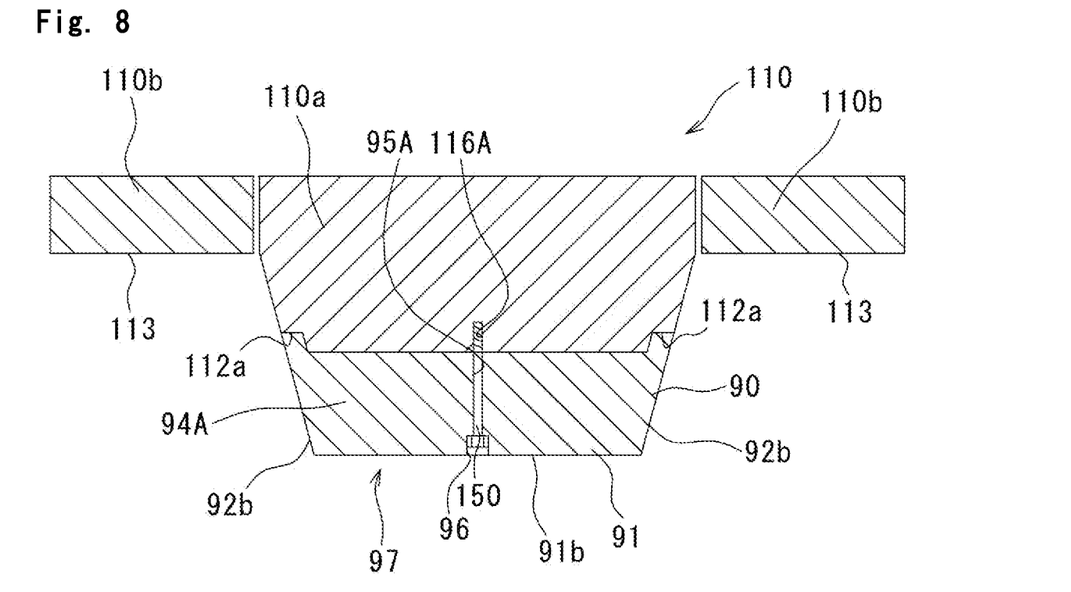
FIG. 8 is a cross-sectional view similar to FIG. 7, illustrating a variation of the first embodiment of the present invention.

Referring to FIGS. 6 and 7, in the present embodiment, the cap 90 is fixed to the upper mold 110 with a screw 150 that is a male screw. Specifically, through holes 95A to 95E penetrating from the lower surface 91b of the cap bottom wall 91 toward the upper mold 110 are provided at portions where the first protrusion 93 and the second protrusions 94A to 94E intersect. Further, the upper mold 110 is provided with screw holes 116A to 116E which are female screws aligned with the through holes 95A to 95E. The cap 90 is fixed to the upper mold 110 by fastening the screw 150 to the screw holes 116A to 116E through the through holes 95A to 95E.

Further, a counterbore 96 having a diameter larger than that of the through holes 95A to 95E is provided on the lower surface 91b side of the through holes 95A to 95E, and when the screw 150 is fastened, a head portion of the screw 150 is housed in the counterbore 96 so as not to protrude from the lower surface 91b of the cap bottom wall 91.

Since the cap 90 is fixed to the upper mold 110 with the screw 150, the cap 90 is removed from the upper mold 110 by removing the screw 150. That is, the cap 90 is detachably fixed to the upper mold 110. The cap 90 may be fixed to the upper mold 110 by adhesion using a double-sided tape or the like, or may be fixed by a magnetic force generated from a magnet embedded in the upper mold 110.

A method for producing the metal-resin composite 1 in the present embodiment will be described with reference to FIGS. 9 to 13. In the drawings, the horizontal direction is indicated as an X direction, and the vertical direction is indicated as a Y direction. Further, the metal-resin composite 1 (the metal plate 10 and the resin material 20) is hatched to indicate a cross section. However, hatching is omitted for other members for clarity of illustration.

In the present embodiment, press molding is performed twice while first to fifth steps illustrated in FIGS. 9 to 13 are executed sequentially. First pressing is executed in the first to third steps illustrated in FIGS. 9 to 11, and second pressing is executed in the third to fifth steps illustrated in FIGS. 11 to 13.

Figure 9:
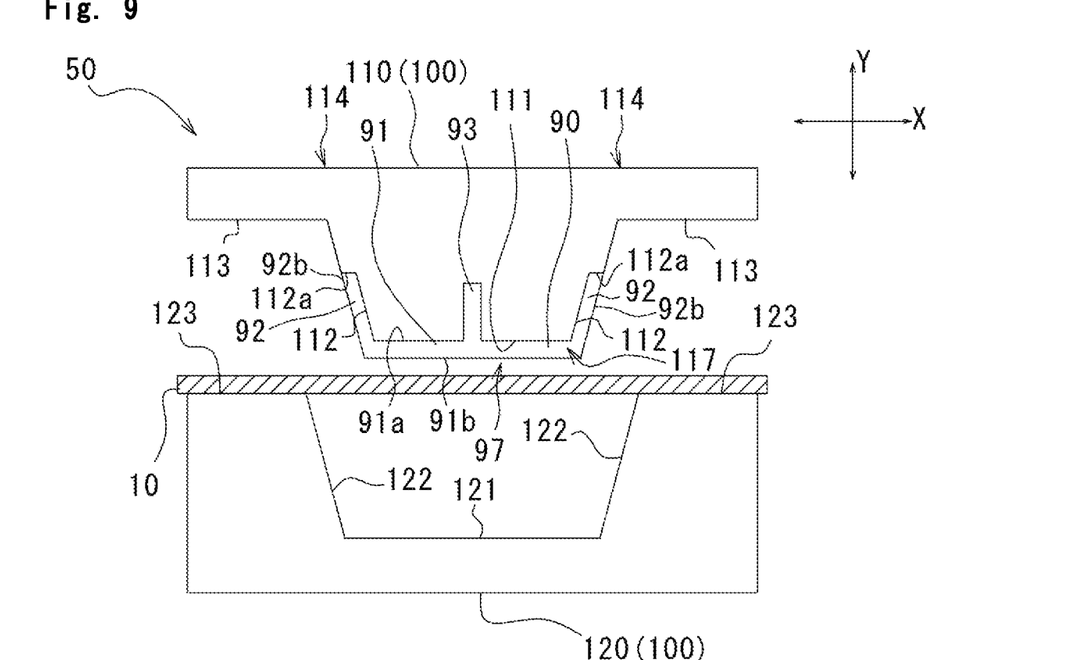
FIG. 9 is a cross-sectional view illustrating a first step of a method for producing the metal-resin composite in the first embodiment.

In the first step illustrated in FIG. 9, in a state where the cap 90 attached to the upper mold 110, the metal plate 10 having a flat plate shape before molding is placed on the lower mold 120.

Figure 10:
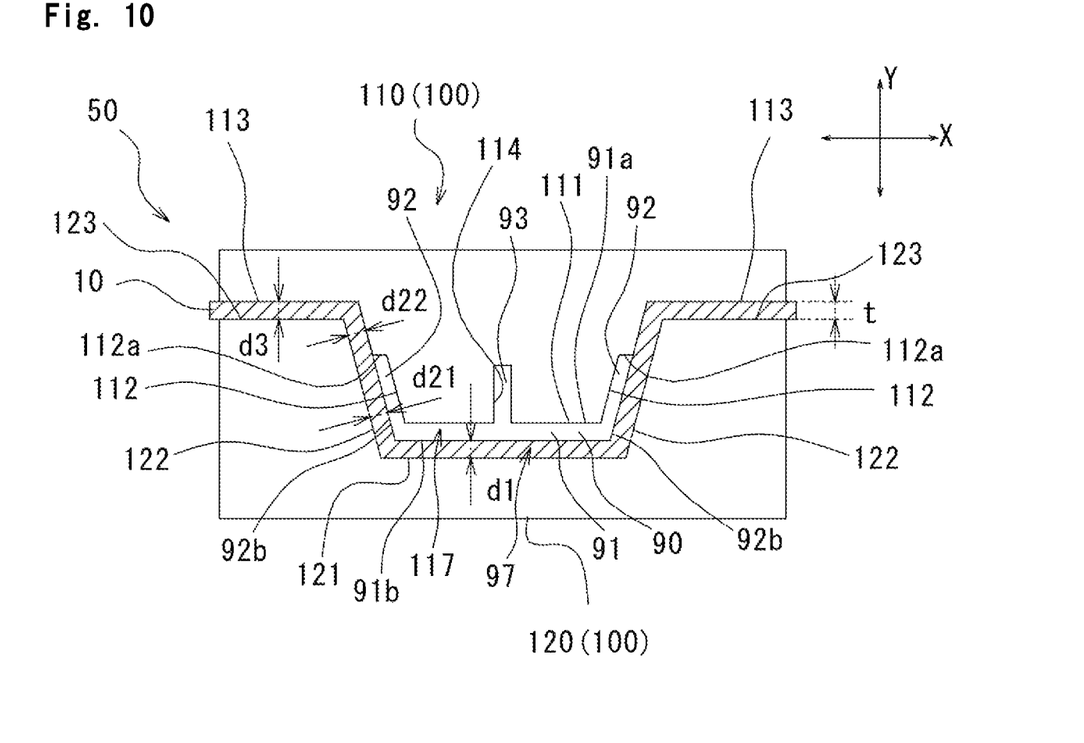
FIG. 10 is a cross-sectional view illustrating a second step of the method for producing the metal-resin composite in the first embodiment.

In the second step illustrated in FIG. 10, the upper mold 110 is lowered, and the metal plate 10 is sandwiched between the upper mold 110 to which the cap 90 is attached and the lower mold 120 and press molded into a hat shape. At this time, the metal plate 10 is mainly pressed toward the lower mold 120 by the first press surface 97. In a state where the upper mold 110 and the lower mold 120 are closed, a distance d1 between the lower surface 91b of the cap bottom wall 91 and the first molding lower surface 121 is substantially equal to a thickness t of the metal plate 10 (d1=t). By setting the distance d1 equal to the thickness t of the metal plate 10, the molding accuracy of the metal plate 10 can be improved. Further, a distance d3 between the third molding upper surface 113 and the third molding lower surface 123 is substantially equal to the thickness t of the metal plate 10 (d3=t). Further, a distance d21 between the outer surface 92b of the cap side wall 92 and the second molding lower surface 122 below the step 112a is substantially equal to or slightly larger than the thickness t of the metal plate 10 (d21=t or d21>t). Further, a distance d22 between the second molding upper surface 112 and the second molding lower surface 122 above the step 112a is substantially equal to or slightly larger than the thickness t of the metal plate 10 (d22=t or d22>t). In particular, by setting the distance d22 equal to the thickness t of the metal plate 10, filling pressure of the resin material 20 in a subsequent step can be increased. Note that, in this step, the resin material 20 (see FIGS. 11 to 13) is not provided yet, and only metal plate 10 is sandwiched between upper mold 110 and lower mold 120 with the cap 90 interposed between them.

Figure 11:
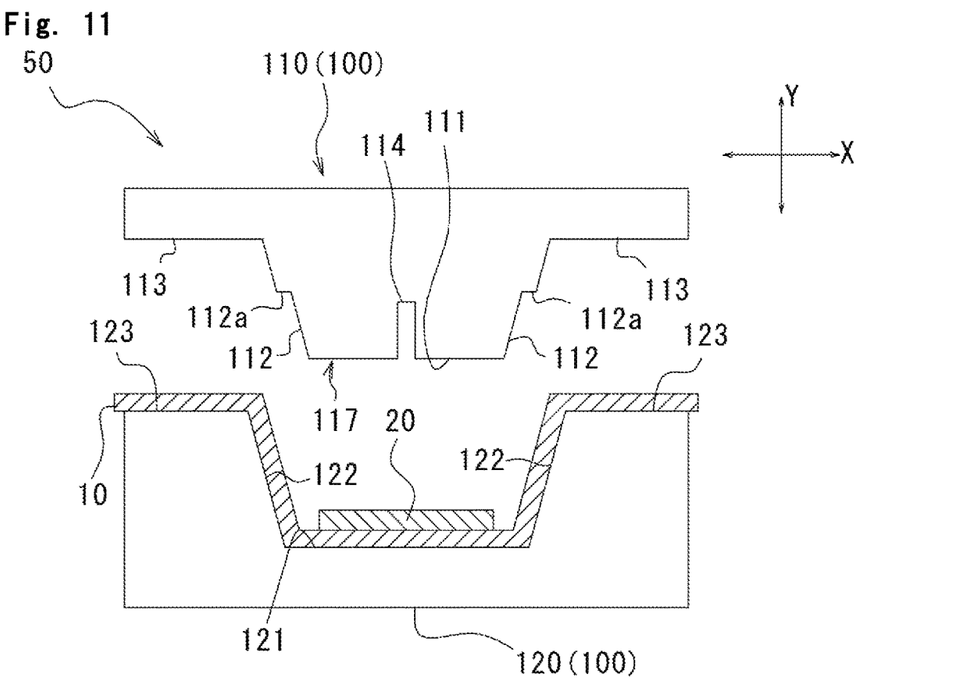
FIG. 11 is a cross-sectional view illustrating a third step of the method for producing the metal-resin composite in the first embodiment.

In the third step illustrated in FIG. 11, the upper mold 110 is raised. At this time, the metal plate 10 is molded into a final shape (a hat shape in the present embodiment). Then, the resin material 20 having a sheet-like shape (also referred to as prepreg) cut into a necessary size is placed on the metal plate 10. In the present embodiment, the resin material 20 is cured at a high temperature and a high pressure by a molding method called sheet molding compound (SMC) method (see the fourth step described later). In the present embodiment, as the resin material 20, a fiber reinforced plastic (FRP) in which a glass fiber or a carbon fiber is impregnated into resin is used. Further, in the present embodiment, the resin material 20 has a thermosetting property. In this step, the resin material 20 is not yet heated, that is, not cured. Note that the resin material 20 does not need to have a sheet-like shape, and can have any shape.

Further, in the third step, the cap 90 is removed from the upper mold 110. The distances d1 and d21 (see FIG. 10) between the first press surface 97 and the lower mold 120 in a state where the cap 90 is attached are shorter than the distances d4 and d5 (see FIG. 12) between the second press surface 117 and the lower mold 120 in a state where the cap 90 is removed. More specifically, the distance d1 is shorter than the distance d4, and the distance d21 is shorter than the distance d5. After the cap 90 is removed, a filling screw (not illustrated) is fastened to the screw holes 116A to 116E so that the resin material 20 does not enter the screw holes 116A to 116E of the upper mold 110, and the screw holes 116A to 116E are filled.

Figure 12:
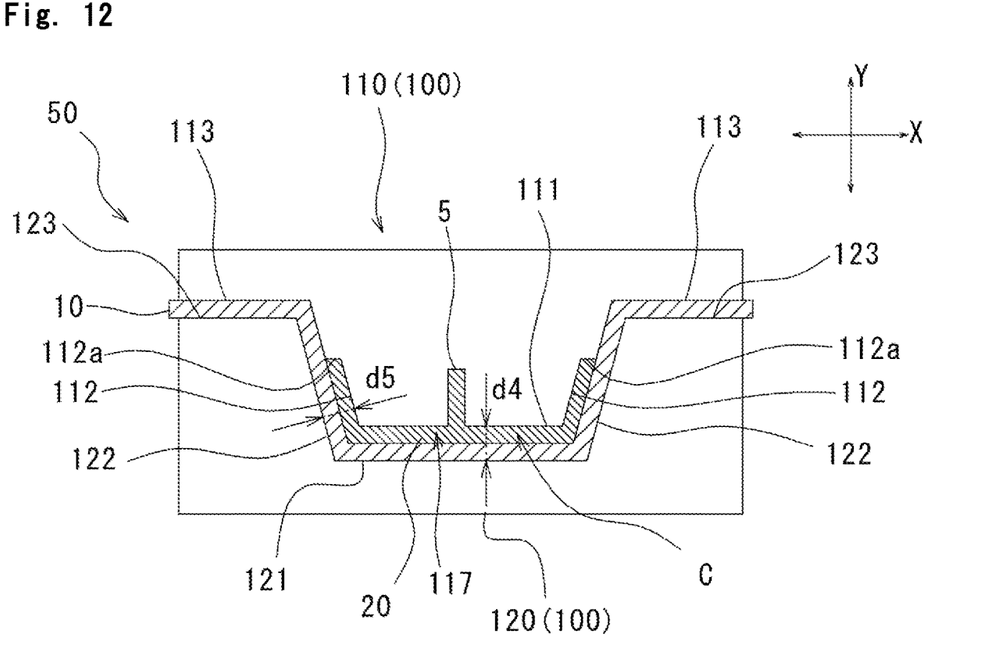
FIG. 12 is a cross-sectional view illustrating a fourth step of the method for producing the metal-resin composite in the first embodiment.

In a fourth step illustrated in FIG. 12, the upper mold 110 is lowered, and the metal plate 10 and the resin material 20 are sandwiched between the upper mold 110 and the lower mold 120 to be press molded so that the resin material 20 is fixed to the metal plate 10. At this time, the metal plate 10 and the resin material 20 are pressed against the lower mold 120 by the second press surface 117. The cavity C that is provided between the first and second molding upper surfaces 111 and 112 and the first and second molding lower surfaces 121 and 122 (specifically, the metal plate 10) is filled with the resin material 20. That is, the resin material 20 cut to a necessary size is put into the mold 100 and cured under high temperature and high pressure by the SMC method. In the present embodiment, the cavity C refers to a space below the step 112a formed by being sandwiched between the upper mold 110 and the lower mold 120 (specifically, the metal plate 10) and a space defined by the first groove portion 114 and the second groove portions 115A to 115E.

When the cavity C is filled with the resin material 20, the resin material 20 also flows into the first groove portion 114 and the second groove portions 115A to 115E of the upper mold 110, and the first rib 5 and the second ribs 6A to 6E (see FIG. 1) are formed. Note that, in the present embodiment, the cap 90 is arranged so as to fill the entire cavity C, and the entire cavity C is filled with the resin material 20. Therefore, as illustrated in FIGS. 1 and 5, the cap 90 and the resin material 20 in the metal-resin composite 1 have substantially the same shape.

Figure 13:
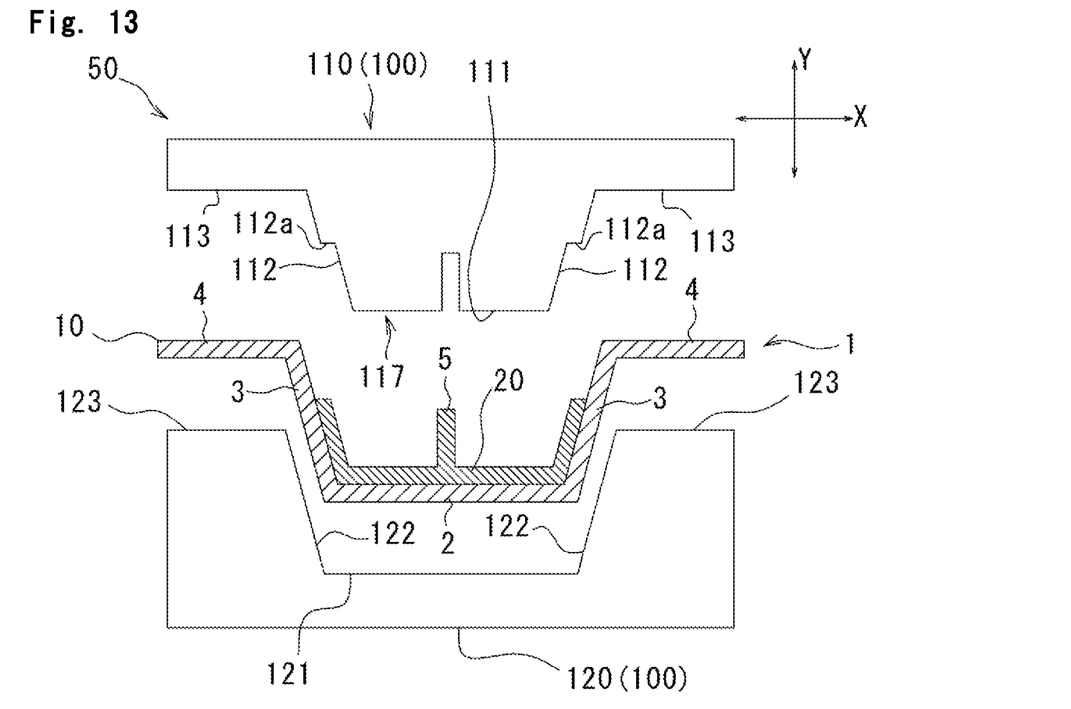
FIG. 13 is a cross-sectional view illustrating a fifth step of the method for producing the metal-resin composite in the first embodiment.

In the fifth step illustrated in FIG. 13, the upper mold 110 is raised. The resin material 20 is fixed to an upper surface (hat-shaped recessed surface) of the metal plate 10 and the metal-resin composite 1 is formed. In this way, the metal-resin composite 1 having a hat shape is produced as a product.

In a case where press molding of the metal plate 10 and integral molding of the metal plate 10 and the resin material 20 are performed with a set of the molds 100, the cavity C in which the resin material 20 is arranged is formed in a state where the upper mold 110 and the lower mold 120 are closed. For this reason, during press molding of the metal plate 10, the upper mold 110 cannot mold the metal plate 10 along the shape of a molding surface of the lower mold 120 in a location where the cavity C is formed. In contrast, according to the present embodiment, first, the cap 90 is attached to the upper mold 110 when the metal plate 10 is press molded, and then the cap 90 can be removed from the upper mold 110 when the metal-resin composite 1 is press molded. Further, the distances d1 and d21 between the first press surface 97 and the lower mold 120 in a state where the cap 90 is attached are shorter than the distances d4 and d5 between the second press surface 117 and the lower mold 120 in a state where the cap 90 is removed. That is, since at least a part of the cavity C is filled with the cap 90 during the press molding of the metal plate 10, the cavity C is reduced, and the metal plate 10 easily follows the shape of the lower mold 120 during the press molding of the metal plate 10. As a result, molding accuracy of the metal plate 10 can be improved. Then, when the metal-resin composite 1 is press molded, the cavity C having a desired size and shape can be formed by removing the cap 90, so that the metal-resin composite 1 having a desired shape can be produced.

Further, in a case where the upper mold 110 and the lower mold 120 are closed in a state where the cap 90 is attached to the upper mold 110, the metal plate 10 easily follows the shape of the lower mold 120 at the time of press molding of the metal plate 10 since the cavity C does not exist. For this reason, molding accuracy of the metal plate 10 can be improved.

When the resin material 20 is provided in the fourth step, the resin material 20 needs to flow beyond the step 112a of the upper mold 110 in order to leak from the cavity C, and the cavity C can be sealed by the step 112a. Therefore, leakage of the resin material 20 can be suppressed. That is, the filling pressure of the resin material 20 in the cavity C can be increased, and the quality can be improved.

Since the cap 90 is fixed to the upper mold 110 with the screw 150, the cap 90 can be mechanically firmly fixed to the upper mold 110. For this reason, detachment of the cap 90 from the upper mold 110 can be suppressed or prevented during press molding.

In the metal-resin composite 1 in the present embodiment, since the first rib 5 and the second ribs 6A to 6B are molded, the strength of the metal-resin composite 1 can be improved.

Second Embodiment

Figure 14:
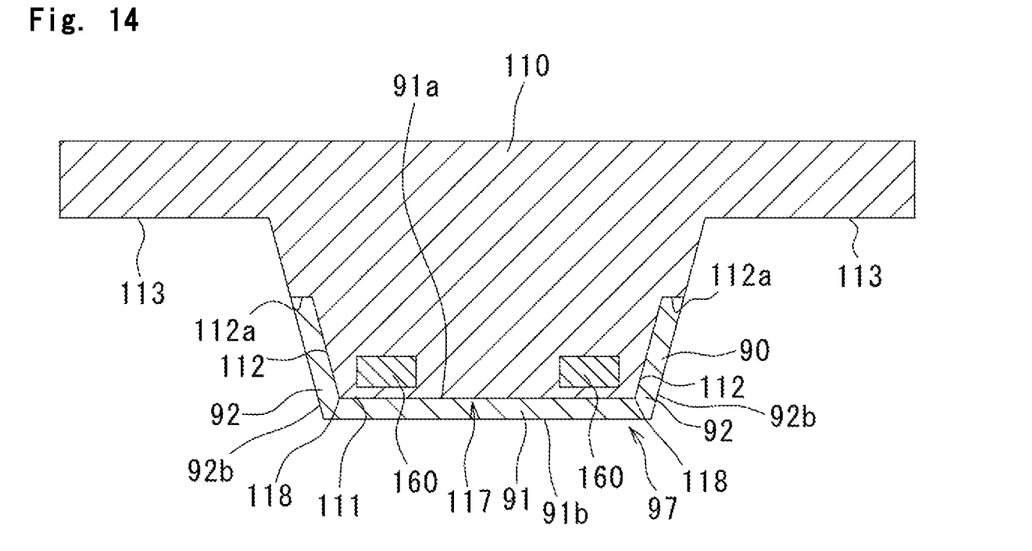
FIG. 14 is a cross-sectional view taken along line XIV-XIV in FIG. 6 in a second embodiment of the present invention.

In the second embodiment illustrated in FIG. 14, the first groove portion 114 (see FIG. 4) and the second groove portions 115A to 115E (see FIG. 4) are not provided in the upper mold 110. Further, the cap 90 is not provided with the first protrusion 93 (see FIG. 5) or the second protrusions 94A to 94E (see FIG. 5).

Furthermore, a magnet 160 is embedded in the upper mold 110. The present embodiment is substantially the same as the first embodiment except for these. Therefore, the description of a portion illustrated in the first embodiment may be omitted.

In the second embodiment, the cap 90 has a substantially C-shaped plate shape, and has only the cap bottom wall 91 and the cap side wall 92. The cap 90 is formed by forming a metal plate. Note that the method of forming the cap 90 is not limited to bending, and can be formed by cutting, for example.

The magnet 160 is embedded in the upper mold 110. For this reason, the cap 90 made from metal is fixed to the upper mold 110 by a magnetic force.

In the second embodiment, since the cap 90 is formed by bending a metal plate, processing is easy. That is, the number of manufacturing steps of the cap 90 can be reduced. Since the cap 90 is fixed to the upper mold 110 by the magnet 160, the cap 90 can be easily attached and detached.

Figure 15:
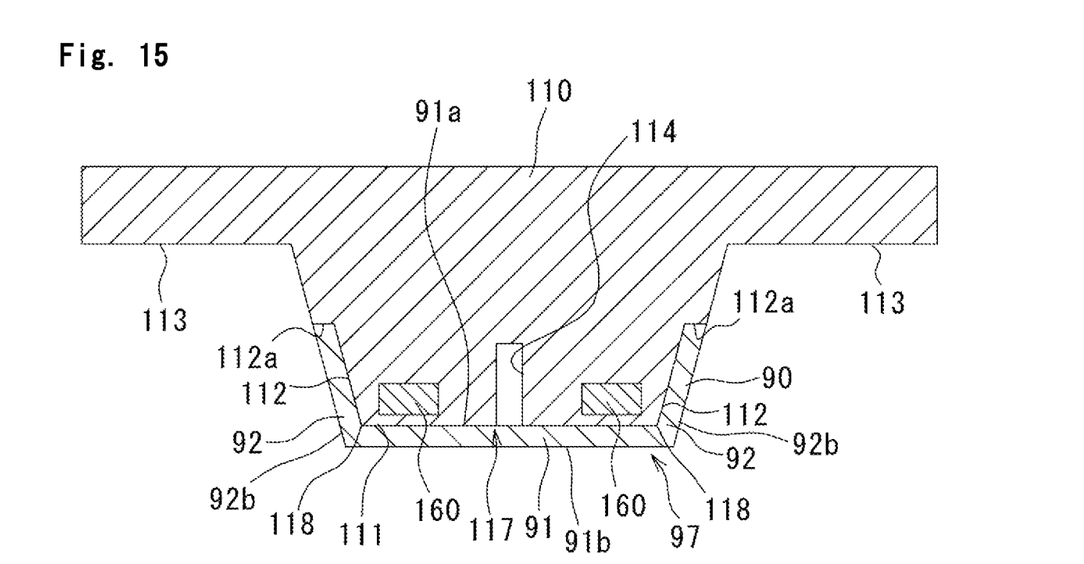
FIG. 15 is a cross-sectional view similar to FIG. 14 illustrating a variation of the second embodiment of the present invention.

Referring to FIG. 15, in a variation of the second embodiment, as shown in the first embodiment, the upper mold 110 is provided with the first groove portion 114 and the second groove portions 115A to 115E (see FIG. 4). Further, the cap 90 is not provided with the first protrusion 93 (see FIG. 5) or the second protrusions 94A to 94E (see FIG. 5).

In the present variation, the cap 90 can also be attached to the upper mold 110 to which the cap 90 illustrated in the first embodiment is attached. In other words, the caps 90 having different shapes can be attached to the common upper mold 110.

Figure 16:
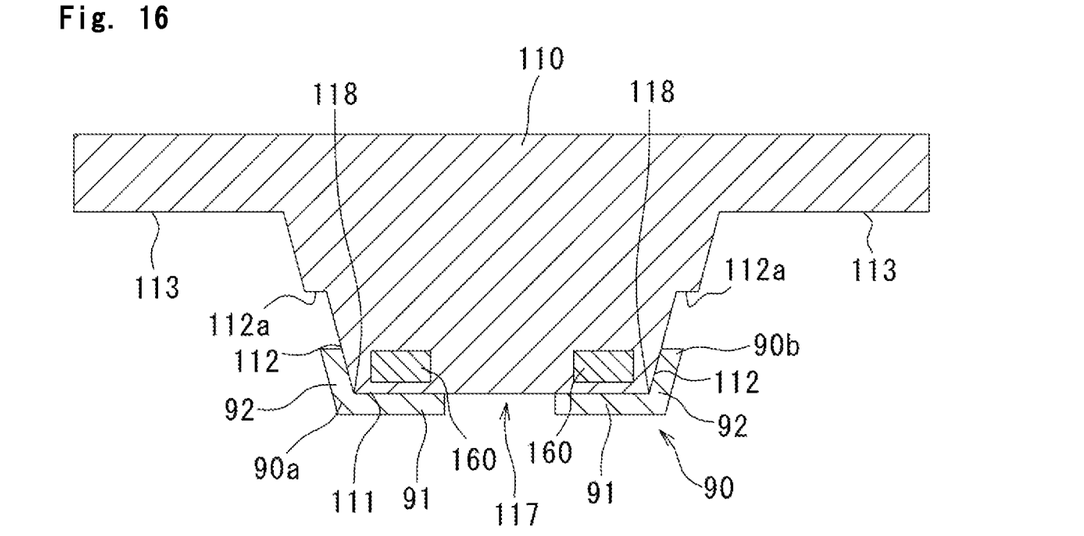
FIG. 16 is a cross-sectional view similar to FIG. 14 illustrating a variation of the second embodiment of the present invention.

Referring to FIG. 16, in a variation of the second embodiment, the cap 90 includes corner caps 90a and 90b. The corner caps 90a and 90b are detachably fixed so as to fill a part of the cavity C (see FIG. 12). Specifically, the corner caps 90a and 90b are arranged so as to cover only the corner portion 118 formed by the first molding upper surface 111 and the second molding upper surface 112 of the upper mold 110.

Since the cap 90 is configured to fill only a part of the cavity C, the weight of the cap 90 is reduced, and the cap 90 can be easily attached and detached.

Further, since the cap 90 is attached to the corner portion 118 formed by the first molding upper surface 111 and the second molding upper surface 112, the distance d1 (see FIG. 10) and the distance d21 (see FIG. 10) at the corner portion 118 are equal to the thickness t of the metal plate 10 when the metal plate 10 is press molded in the second step. In other words, the cavity C at the corner portion 118 is reduced. At a location where the cavity C is reduced, the metal plate 10 easily follows the shape of the lower mold 120 during the press molding of the metal plate 10, so that molding accuracy at the corner portion 118 of the metal plate 10 can be improved. In particular, since the molding accuracy is required at the corner portion 118, it is effective to increase the dimensional accuracy by reducing the cavity C at the corner portion 118. Further, a straight portion where the metal plate 10 is not bent can be formed into a final shape by being press molded together with the resin material 20 in the fourth step. Therefore, the molding accuracy of the metal-resin composite 1 can be improved.

In the metal-resin composite 1, an adhesive layer may be provided between the metal plate 10 and the resin material 20. In this case, by providing the adhesive layer, the metal member 10 and the resin material 20 can be firmly integrally molded.

What is claimed is:

1. An apparatus for producing a metal-resin composite by press molding a metal member and a resin material, the apparatus comprising:
a mold including an upper mold and a lower mold that sandwich the metal member and the resin material;
a molding auxiliary component detachably fixed to the upper mold so as to fill at least a part of a cavity for arranging the resin material formed by the upper mold and the lower mold; and
a drive unit that moves at least one of the upper mold and the lower mold in a vertical direction, wherein
the molding auxiliary component has a first press surface for molding the metal member to form a molded metal member,
the upper mold has a second press surface for directly contacting the resin material for integrally molding the resin material to the molded metal member,
a distance between the first press surface and the lower mold in a state where the molding auxiliary component is attached is shorter than a distance between the second press surface and the lower mold in a state where the molding auxiliary component is removed, and
the upper and lower molds are for pressing the resin material between the second press surface and the lower mold to cause the resin material to flow to fill the cavity with the resin material when the molding auxiliary component is removed such that the molding auxiliary component and the resin material have substantially the same shape.

2. The apparatus according claim 1, wherein
the metal-resin composite has, in a cross section perpendicular to a longitudinal direction, a bottom wall portion extending in a horizontal direction, side wall portions rising from opposite ends of the bottom wall portion, and a flange portion extending outward in the horizontal direction from each of the side wall portions,
the upper mold has, in the cross section, a first molding upper surface for molding the bottom wall portion, a second molding upper surface for molding each of the side wall portions, and a third molding upper surface for molding each of the flange portions, and
the molding auxiliary component is arranged so as to cover a corner portion formed by the first molding upper surface and the second molding upper surface.

3. The apparatus according to claim 2, wherein the second molding upper surface is provided with a step.

4. The apparatus according to claim 1, wherein the molding auxiliary component is detachably fixed to the upper mold so as to fill the entire cavity.

5. The apparatus according to claim 1, wherein
the molding auxiliary component is provided with a through hole,
the upper mold is provided with a screw hole aligned with the through hole, and
the molding auxiliary component is fixed to the upper mold as a screw is fastened to the screw hole via the through hole.

6. The apparatus according to claim 2, wherein the molding auxiliary component is detachably fixed to the upper mold so as to fill the entire cavity.

7. The apparatus according to claim 3, wherein the molding auxiliary component is detachably fixed to the upper mold so as to fill the entire cavity.

8. The apparatus according to claim 2, wherein
the molding auxiliary component is provided with a through hole,
the upper mold is provided with a screw hole aligned with the through hole, and
the molding auxiliary component is fixed to the upper mold as a screw is fastened to the screw hole via the through hole.

9. The apparatus according to claim 3, wherein
the molding auxiliary component is provided with a through hole,
the upper mold is provided with a screw hole aligned with the through hole, and
the molding auxiliary component is fixed to the upper mold as a screw is fastened to the screw hole via the through hole.

10. The apparatus according to claim 4, wherein
the molding auxiliary component is provided with a through hole,
the upper mold is provided with a screw hole aligned with the through hole, and
the molding auxiliary component is fixed to the upper mold as a screw is fastened to the screw hole via the through hole.

11. A mold set for producing a metal-resin composite by press molding a metal member and a resin material, the mold set comprising:
a mold including an upper mold and a lower mold that sandwich the metal member and the resin material; and
a molding auxiliary component detachably fixed to the upper mold so as to fill at least a part of a cavity for arranging the resin material formed by the upper mold and the lower mold, wherein
the molding auxiliary component has a first press surface for molding the metal member to form a molded metal member,
the upper mold has a second press surface for directly contacting the resin material for integrally molding the resin material to the molded metal member,
a distance between the first press surface and the lower mold in a state where the molding auxiliary component is attached is shorter than a distance between the second press surface and the lower mold in a state where the molding auxiliary component is removed, and
the upper and lower molds are for pressing the resin material between the second press surface and the lower mold to cause the resin material to flow to fill the cavity with the resin material when the molding auxiliary component is removed such that the molding auxiliary component and the resin material have substantially the same shape.

* * * * *